(12) United States Patent
Wang et al.

(10) Patent No.: US 9,599,787 B2
(45) Date of Patent: Mar. 21, 2017

(54) USING SAPPHIRE LENS TO PROTECT THE LENS MODULE

(75) Inventors: Wei-Hsiang Wang, Taipei (TW); Chen-Hui Wu, Taoyuan County (TW)

(73) Assignee: TERA XTAL TECHNOLOGY CORPORATION, Hsinchu (TW)

( * ) Notice: Subject to any disclaimer, the term of this patent is extended or adjusted under 35 U.S.C. 154(b) by 174 days.

(21) Appl. No.: 13/593,540

(22) Filed: Aug. 24, 2012

(65) Prior Publication Data
US 2013/0162891 A1    Jun. 27, 2013

(30) Foreign Application Priority Data
Dec. 27, 2011    (TW) .............................. 100149015 A

(51) Int. Cl.
*G02B 7/02*        (2006.01)
*G02B 1/02*        (2006.01)
*H04N 5/225*       (2006.01)

(52) U.S. Cl.
CPC .............. *G02B 7/025* (2013.01); *G02B 1/02* (2013.01); *H04N 5/225* (2013.01); *H04N 5/2254* (2013.01)

(58) Field of Classification Search
CPC .................................................... H04N 5/2254
(Continued)

(56) References Cited

U.S. PATENT DOCUMENTS

| 5,135,814 A | 8/1992 | Dekosky |
| 6,167,069 A | 12/2000 | Page et al. |

(Continued)

FOREIGN PATENT DOCUMENTS

| CN | 1233763 A | 11/1999 |
| CN | 1653359 A | 8/2005 |

(Continued)

OTHER PUBLICATIONS

"Springer Handbook of Lasers and Optics", Frank Trager, pp. 325-326 (2007).

(Continued)

*Primary Examiner* — Nhan T Tran
*Assistant Examiner* — Chan Nguyen
(74) *Attorney, Agent, or Firm* — Christensen, Fonder, Dardi & Herbert PLLC

(57) ABSTRACT

An image capturing device is provided. The image capturing device includes a lens device including a first housing; and a sapphire lens directly connected to the first housing for protecting the lens device, wherein the sapphire lens includes a crystal structure and has a crystal axis, the crystal structure is a single-crystal structure, and the crystal axis includes one selected from a group consisting of c-axis (0001), a-axis ($1\bar{2}10$), a-axis ($11\bar{2}0$), a-axis ($2\bar{1}\bar{1}0$), a-axis ($\bar{1}\bar{1}20$), a-axis ($\bar{2}110$), a-axis ($\bar{1}2\bar{1}0$), m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), r-axis ($10\bar{1}1$), r-axis ($\bar{1}01\bar{1}$), r-axis ($01\bar{1}\bar{1}$), r-axis ($0\bar{1}11$), r-axis ($1\bar{1}0\bar{1}$) and r-axis ($\bar{1}101$).

9 Claims, 11 Drawing Sheets

(58) Field of Classification Search
USPC .................................................. 348/374, 335
See application file for complete search history.

(56) References Cited

U.S. PATENT DOCUMENTS

| | | | |
|---|---|---|---|
| 6,362,925 | B1 | 3/2002 | Nakamura et al. |
| 6,793,416 | B2* | 9/2004 | Peterson et al. .............. 396/427 |
| 7,826,729 | B2 | 11/2010 | Cullen et al. |
| 2002/0104968 | A1* | 8/2002 | Stewart ........................ 250/353 |
| 2003/0164895 | A1* | 9/2003 | Viinikanoja ......... G02B 13/009 348/375 |
| 2003/0210906 | A1* | 11/2003 | Peterson et al. .............. 396/427 |
| 2004/0071460 | A1 | 4/2004 | Nishimura et al. |
| 2004/0109486 | A1* | 6/2004 | Kinoshita et al. .............. 372/45 |
| 2005/0151876 | A1 | 7/2005 | Karr |
| 2005/0219399 | A1 | 10/2005 | Sato et al. |
| 2006/0109367 | A1* | 5/2006 | Hirooka ........................ 348/340 |
| 2008/0151079 | A1* | 6/2008 | Iijima .................. H04N 3/1593 348/241 |
| 2010/0277800 | A1 | 11/2010 | Wu |
| 2011/0043913 | A1* | 2/2011 | Wang ................ G02B 27/0006 359/511 |
| 2011/0050989 | A1 | 3/2011 | Kim et al. |
| 2012/0093494 | A1* | 4/2012 | Wang et al. .................... 396/72 |
| 2012/0218312 | A1* | 8/2012 | Goldsmith et al. ........... 345/690 |
| 2012/0262888 | A1* | 10/2012 | Liu .................... H01R 13/6315 361/752 |
| 2013/0236699 | A1 | 9/2013 | Prest et al. |
| 2014/0139978 | A1 | 5/2014 | Kwong |

FOREIGN PATENT DOCUMENTS

| | | | |
|---|---|---|---|
| CN | 1939050 | A | 3/2007 |
| CN | 101126830 | A | 2/2008 |
| CN | 101193507 | A | 6/2008 |
| CN | 101379417 | A | 3/2009 |
| CN | 201269945 | Y | 7/2009 |
| CN | 101522961 | A | 9/2009 |
| CN | 101989027 | A | 3/2011 |
| CN | 102076192 | A | 5/2011 |
| DE | 37 40416 | A1 | 6/1989 |
| FR | 2919396 | A1 | 1/2009 |
| KR | 1020110018217 | A | 2/2011 |
| TW | 200813613 | A | 3/2005 |
| TW | M267775 | A | 6/2005 |
| TW | 201122705 | * | 7/2011 ............. G03B 17/02 |
| TW | 201122705 | A | 7/2011 |
| TW | M438642 | U | 10/2012 |
| WO | 03003407 | A1 | 1/2003 |
| WO | 2007094956 | A2 | 8/2007 |

OTHER PUBLICATIONS

Evaluation Report of PRC Utility Model No. ZL 2012 2 0245743.1 requested on Dec. 12, 2013.
Notice of Allowance of KR Patent Application No. 10-2012-0133831 issued on Dec. 27, 2013.
ASUS Lamborghini VX3 notebook. <http://www.mobile01.com/topicdelail.php?f-233&t-714058> printed Feb. 16, 2015. 52 pages.
Celsius X VI II. Europe Star 2010 <http://www.watches-for-china.com/sponsors/4435.html> printed Mar. 11, 2015. 8 pages.
ASUS notebook. DG BEST. Apr. 2008. 12 pages.
"Single Crystal Sapphire" Kyocera. printed Feb. 16, 2015. 9 pages.
"The Rolex History & Timeline." The Evolution & History of Rolex. <https://beckertime.com/the-evolution-history-of-rolex/> printed Mar. 11, 2015. 14 pages.
"Asus (Feature Phone)" Mobile01 printed Mar. 11, 2015. 19 pages.
Webster's Third New International Dictionary. 2002 p. 1908. 3 pages.
"Vertu cell phone & leica camera" <http://2h.wikipedia.org/wiky%E5%BE%95%E5%8D%A1%E7%9B%B8%E6%9C%BA> printed Mar. 11, 2015. 5 pages.
"HTC Desire—scratched camera lens cover" <http://www.androtd-hilfe.de/htc-desire/52424-sammelbestellungen-fotolinse-saphirglas.html> printed Mar. 11, 2015. 32 pages.
"Verdict of No. 89 patent litigation (2010)" <http://fyjud.lawbank.com.tw/PrintData.aspx> printed Apr. 15, 2015. 14 pages.
Decai, Zhao, 2008, Research on the Joining Property of Sapphire, Master's Thesis, retrieved from China Academic Journal Electronic Publishing House.
Hui, et al., "Sapphire Window and It's Application in Military Electro-optical Equipment," (2005) retrieved from China Academic Journal Electronic Publishing House.
Xiaohong, Wang, 2010, "Study on the Morphology and Mechanisms of Sapphire Crystal Growth by Sapmac," Master's Thesis, retrieved from China Academic Journal Electronic Publishing House.
Dobrovinskaya, et al., Sapphire Material, Manufacturing, Applications, Springer Science + Business Media, LLC (2009).
Evaluation Report of Utility Model Patent CN201220245743.1, State Intellectual Property Office of the People's Republic of China, May 29, 2012.
Zhao Kai-hua, et al. "optics"; pp. 165-181.
Judicial Opinions of China, Administrative Ruling in Writing, pp. 1-14.
Interpretation of "Injection moulding" from Wikipedia <https://zh.wikipedia.org/w/index.php?title=;%E6%B3%A8%E5%B0%84%E8%A3%BD%E6%A8%A1&oldidd=36555327.
Product Description of iphone 5s.
Product Description of BlackBerry Porsche Design P'9982 Smartphone.
Product Description of Qingcheng VOGA V1 <http://www.pcpop.com/doc/1/1067/1067662.shtml.
Product Description of MEIZU MX4 Pro <http://www.meizu.com/products/mx4pro/spec.html.
HTC Desire <http://www.android-hilfe.de/thema/how-to-austausch-der-desire-fotolinse-fuer-bessere-fotos-saphirglas.42428/>; <http://www.desire-camera-scratched.com/>; <http://androidforums.com/threads/htc-desire-scratched-camera-lens-cover.126809/> ; <http://forum.xda-developers.com/showthread.php?t=690805&page=2> http://forum.xda-developers.com/showtread.php?t=79793.
The answer of "can the posting time at ChinaRen be changed by a group leader" from Baidu http://zhidao.baidu.com/link?url=jAHAHORXz-YDbHD ygEFIK-FEq-138pt4dbLjQ3YgbpLX-G7ITUmj0aizQcN3SvVEs5GNwzL0cnDIsWIfH1jiLOK.
The answer of "can the posting time at ChinaRen be changed" from Baidu http://zhidao.baidu.com/question/158037104.html?qb1=relate_question—0.
The answer of "how to change the posting time at dz Forum" from DISCUZ Forum <http://www.discuz.net/thread-2387775-1-1.html.
Product Specification "X-ray single crystal orientation instrument".
ASUS-Lamborghini VX3 inkPadX300 v.s. MacBook Air, Mobile World Congress from Digital Space periodical, Apr. 2008.
ASUS-Lamborghini VX3 from Household appliance periodical, Apr. 2008.
Asus-Lamborghini VX3 from China information world newspaper, Mar. 17, 2008.
ASUS-Lamborghini VX3 <www.asus.com.cn/Notebooks_Ultrabooks/AsusLamborghini_VX3> ; <notebook.pconline.com.cn/testing/cn/asus/0803/1239710_all.html#content_page_1>.
HTC Desire <http://www.amazon.de/gp/product/B004J2WWGK/ref=as_li_qf_sp_asin_il_tl?ie=UTF8&tag=desirecamer as-21 &linkCode=as2&camp=1638&creative=6742 &creativeASIN=B004J2WWGK>.
Expert prospectus judicature for CN 201220245743.1, A Pondering on Developing The Sapphire Processing Industry.
Expertise report of comparing CN 201220245743.1 with ASUS-Lamborghini VX3.
Evaluation report of utility model patent TW M438642.
Mobiado Luminoso, Preview, (periodical), China Academic Journal Electronic Publishing House, 1994-2015.
Luminoso and Celsius X VI II <tech.sina.com.cn/mobile/n/2007-11-13/11031849148.shtml> ; <arch.pcoline.com.cn/coolshow/new/

(56) References Cited

OTHER PUBLICATIONS mobile/0711/1154229.html> ; <article.pchome.net/content-403093-all.html> ; <sh.sina.com.cn/citylink/sh/sp/2011-01-10/210419941.html> ; www.watches-for-china.cn/WFC.php?page=WFC&id_article=1613&id.

LeDix Origin, Industrial Design, (periodical), China Academic Journal Electronic Publishing House; 1994-2012.

Maynard Smith et al. "Correlation of crystallographic orientation with processing of sapphire optics", Proceedings of SPIE—The International Society for Optical Engineering, vol. 3705, 1999, pp. 85-92.

Huaizhi Yu "Infrared optical materials", National Defense Industry Press.

Gregory J Exarhos "Characterization of optical materials", Materials Characterization Series, Surface Modification of Optical Materials.

Jian-Ying Cui "Optical Machinery Fundamentals, Optical Materials and Processing Technics".

Sun jialong et al. "Cz Sapphire Windows Used in the Infrared Detector", China Academic Journal Electronic Publishing House, 1998-2015.

Zhou Hai et al. "Study of the system of quality inspection for sapphire wafer", China Academic Journal Electronic Publishing House, 1994-2012.

Study on Crystal Defect and Service Performance Evaluation Followed by Strengthening Modification of Sapphire for Optical Window Application.

Response for the invalidation procedure (1).

Response for the invalidation procedure (2).

Konica Big Mini BM-302 mit Konica Lens 35mm / 3.5 Objektiv, Oct. 18, 2015, 1 page.

"Konica Big Mini—Yeah, it's not bad . . . "; 35 MMC, Jul. 8, 2013; 11 pages.

"The Konica Big Mini—The ultimate bargain compact" Japan Camera Hunter, Camera Geekery, by Bellamy, May 22, 2012, 12 pages.

\* cited by examiner

USING SAPPHIRE LENS TO PROTECT THE LENS MODULE

CROSS-REFERENCE TO RELATED APPLICATION AND CLAIM OF PRIORITY

The application claims the benefit of Taiwan Patent Application No. 100149015, filed on Dec. 27, 2011, in the Taiwan Intellectual Property Office, the disclosures of which are incorporated herein in their entirety by reference.

FIELD OF THE INVENTION

The present invention relates to an image capturing device, and more particularly to an image capturing device having a sapphire lens.

BACKGROUND OF THE INVENTION

The hand-held device having a photographing function is very popular in recent years. Due to the development of the semiconductor technology and the mighty advance of the optical design technology, the size of the optical element is getting smaller and smaller. Therefore, the digital camera lens can be widely applied to the mobile device, e.g. the cellphone, hand-held game console, MP3 player, notebook computer, tablet PC, global positioning system, event data recorder, etc.

Since the pixels of the photosensitive element of the digital camera lens are getting higher and higher, the request for the imaging quality of the digital camera is also getting higher and higher. Currently, the protective lens for the mobile device having a photographing function in the market is usually made of a transparent acrylic material or other transparent macromolecular materials. The protective lens made by these materials provides the basic protection for the digital camera lens, and enables the digital camera lens to be normally imaged without being damaged. However, when the digital camera is used by the user for a period of time, the surface of the protective lens made by the acrylic material or the transparent macromolecular material will be damaged due to the frequent friction or collision. At this time, if the digital camera lens takes images via the damaged surface of the protective lens, the imaging quality will be poor, or the photosensitive element cannot correctly and effectively determine the imaging of the object to be taken, which results in the output of the noise. This causes the function of the digital camera to be lowered or inactive.

Please refer to FIGS. 1(a) and 1(b). FIG. 1(a) shows the front of a conventional image capturing device 10, and FIG. 1(b) shows the back of the conventional image capturing device 10 of FIG. 1(a). As shown in FIG. 1(a), the conventional image capturing device 10 includes a front housing 101, a liquid crystal display 102 and keys 103. As shown in FIG. 1(b), the conventional image capturing device 10 further includes a protective lens 104 and a back housing 105.

Please refer to FIG. 2, which shows a conventional image capturing device structure 12. The conventional image capturing device structure 12 includes a protective lens 104, a back housing 105 and a lens module 106. The protective lens 104 is disposed on the back housing 105 for protecting the lens module 106 thereunder. The protecting lens 104 is mainly made of a macromolecular material, which includes the acrylics or polycarbonate resin.

Please refer to FIG. 3, which is a cross-sectional view of the conventional image capturing device structure 12 of FIG. 2. As shown in FIG. 3, the image capturing device structure 12 further includes a liquid crystal display 102 and a circuit board 107. The lens module 106 is electrically connected to the circuit board 107. The circuit board 107 is disposed under the back housing 105. The back housing 105 surrounds the lens module 106. The lens module 106 is disposed under the protecting lens 104 so that it can be protected by the protecting lens 104.

In FIG. 3, the tempered glass also can serve as the protecting lens 104 for the lens module 106. Although the tempered glass is harder than the macromolecular material, the user might be scraped by the tempered glass due to frequent use. Besides, if the image capturing device 10 is fallen onto a hard surface (e.g. the ground) by accident, the tempered glass would be cracked due to the collision of external force. The cracked surface has a sharp angle so that the user is easily cut thereby. Therefore, using the temped glass to serve as the protecting lens 104 for the lens module 106 has potential danger.

Another prior art is to use the stack of multi-layers of materials to serve as the protecting lens 104. However, such stack will result in the loss of light, the poor imaging and the generation of noise.

Please refer to FIG. 4, which is a cross-sectional view of another conventional image capturing device structure 14 in the Taiwan Patent No. M267775. The image capturing device structure 14 includes a protecting lens with multi-layers of materials 109, a back housing 105, a lens module 106, a circuit board 107 and a liquid crystal display 102. The protecting lens with multi-layers of materials 109 includes a protecting lens 104 and a protecting layer 108. Although the protecting layer 108 can enhance the protecting ability of the protecting lens with multi-layers of materials 109, the transmittance will be greatly reduced, thereby affecting the imaging quality of the lens module 106.

In order to overcome the drawbacks in the prior art, an image capturing device is provided. The particular design in the present invention not only solves the problems described above, but also is easy to be implemented. Thus, the present invention has the utility for the industry.

SUMMARY OF THE INVENTION

The present invention provides a protecting lens for a camera lens module of an image capturing device. The protecting lens is made of sapphire. The sapphire has a single-crystal structure and different crystal axes. The hardness of the sapphire substrate is only smaller than that of the diamond. Using the sapphire to serve as the material of the protecting lens can achieve the scratch-resistant, anti-wear and impact-resistant effects. Besides, the excellent mechanical characteristic of the sapphire also can eliminate the reduction of yield or performance due to the collision of external force in the manufacturing process, reduce the loss due to the conveyance in the manufacturing process, and provide a great scratch-resistant function for the lens.

In accordance with an aspect of the present invention, an image capturing device is provided. The image capturing device includes a lens device including a first housing; and a sapphire lens directly connected to the first housing for protecting the lens device, wherein the sapphire lens includes a crystal structure and has a crystal axis, the crystal structure is a single-crystal structure, and the crystal axis includes one selected from a group consisting of c-axis (0001), a-axis ($1\bar{2}10$), a-axis ($11\bar{2}0$), a-axis ($2\bar{1}\bar{1}0$), a-axis ($\bar{1}\bar{1}20$), a-axis ($\bar{2}110$), a-axis ($\bar{1}2\bar{1}0$), m-axis ($\bar{1}010$), m-axis ($\bar{1}100$), m-axis ($01\bar{1}0$), m-axis ($10\bar{1}0$), m-axis ($1\bar{1}00$), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101).

In accordance with another aspect of the present invention, an image capturing device is provided. The image capturing device includes a lens device having a hollow area; and a sapphire lens disposed in the hollow area for protecting the lens device, wherein the sapphire lens includes a crystal structure and has a crystal axis, the crystal structure is a single-crystal structure, and the crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101).

In accordance with a further aspect of the present invention, an image capturing device is provided. The image capturing device includes a lens device; and a sapphire lens directly connected to the lens device, wherein the sapphire lens includes a crystal structure and has a crystal axis, the crystal structure is a single-crystal structure, and the crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis (1010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (011$\bar{1}$), r-axis (0$\bar{1}$11), r-axis (1$\bar{1}$0$\bar{1}$) and r-axis ($\bar{1}$101).

In accordance with further another aspect of the present invention, an image capturing device is provided. The image capturing device includes a lens device; and a sapphire lens directly connected to the lens device.

In accordance with further another aspect of the present invention, a lens device is provided. The lens device includes a lens module; and a sapphire lens disposed on the lens module to constitute the lens device.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 1(*b*) shows the back of the conventional image capturing device of FIG. 1(*a*);

FIG. 5(*b*) shows the back of the image capturing device of FIG. 5(*a*);

FIG. 5(*c*) is a cross-sectional view of an image capturing device structure according to a first embodiment of the present invention;

FIG. 6(*b*) shows the back of the image capturing device of FIG. 6(*a*);

FIG. 6(*c*) is a cross-sectional view of an image capturing device structure according to a second embodiment of the present invention;

FIG. 6(*d*) is a top view of the sapphire lens;

FIG. 6(*e*) shows how the first back housing is connected to the sapphire lens;

FIG. 7(*b*) shows the back of the image capturing device of FIG. 7(*a*);

FIG. 7(*c*) is a cross-sectional view of an image capturing device structure according to a third embodiment of the present invention.

DETAILED DESCRIPTION

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
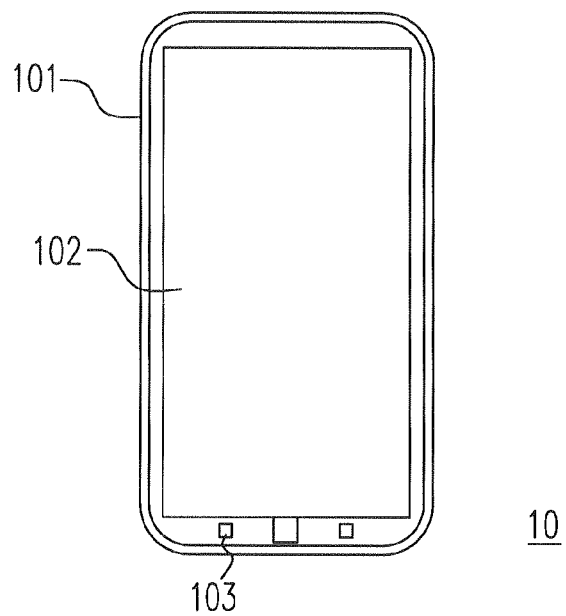
FIG. 1(*a*) shows the front of a conventional image capturing device.
Figure 1B:
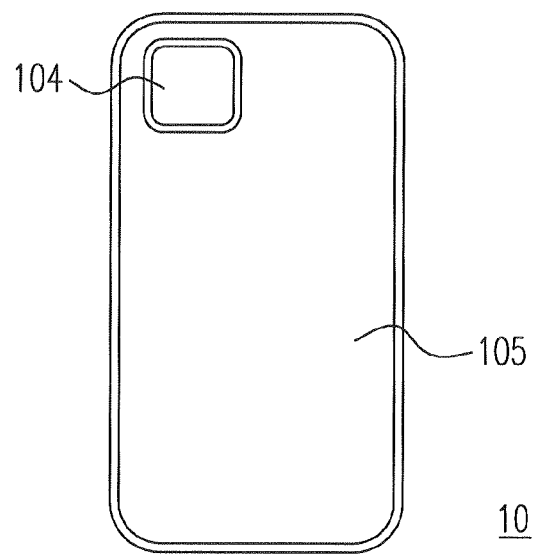
Figure 2:
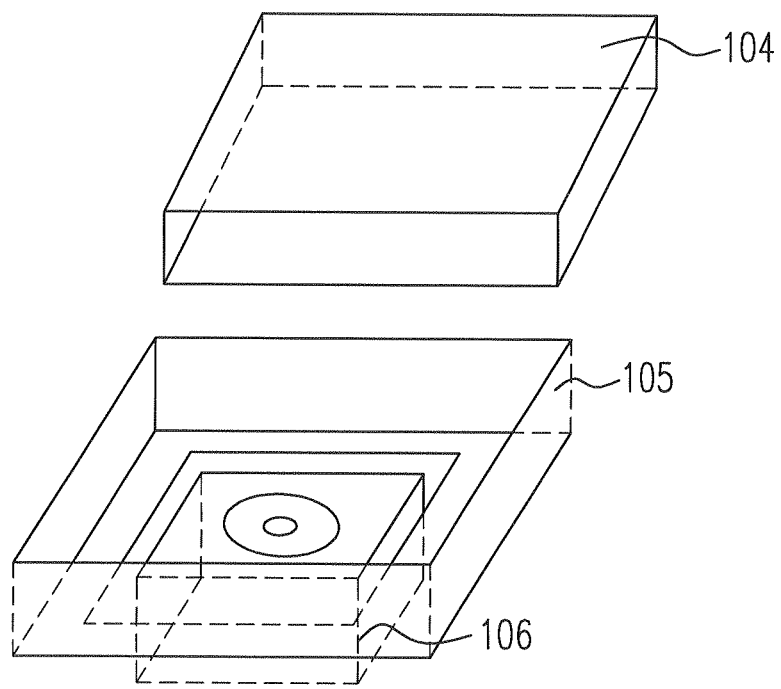
FIG. 2 shows a conventional image capturing device structure.
Figure 3:
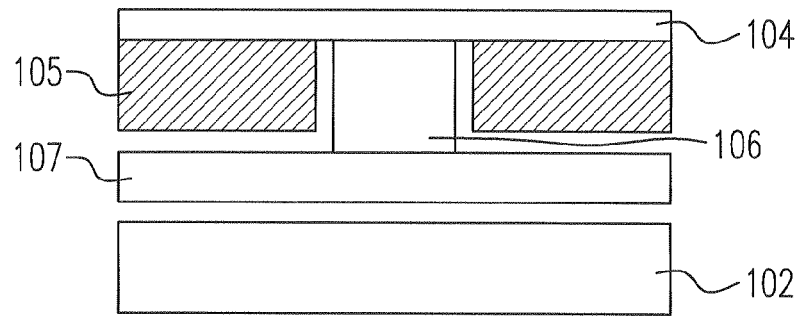
FIG. 3 is a cross-sectional view of the conventional image capturing device structure of FIG. 2.
Figure 4:
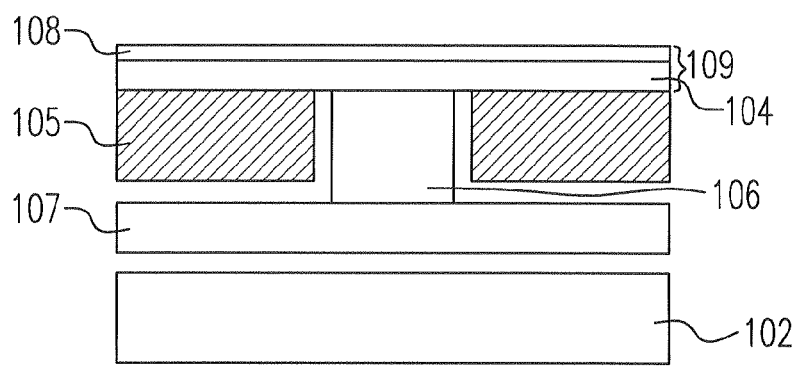
FIG. 4 is a cross-sectional view of another conventional image capturing device structure in the Taiwan Patent No. M267775.
Figure 5A:
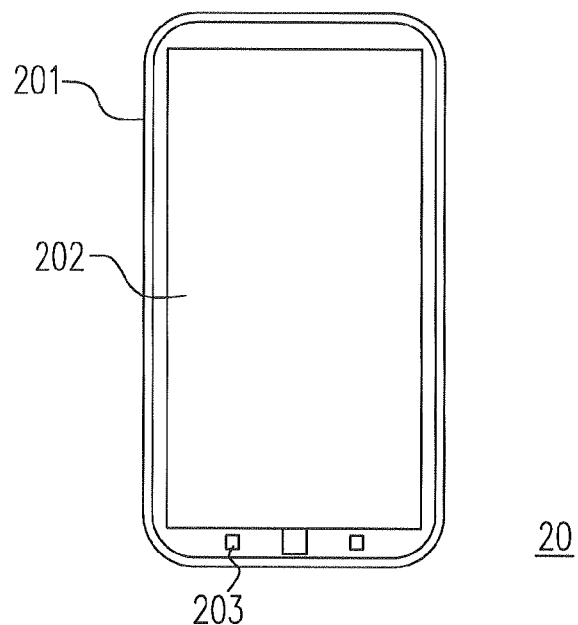
FIG. 5(*a*) shows the front of an image capturing device according to a first embodiment of the present invention.
Figure 5B:
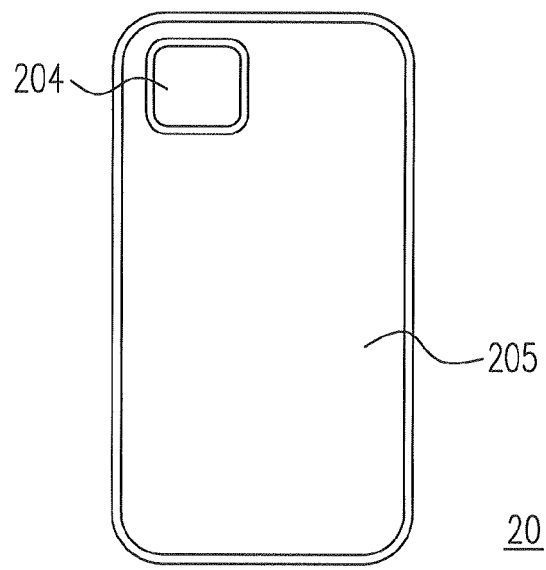

Please refer to FIGS. 5(*a*) and 5(*b*). FIG. 5(*a*) shows the front of an image capturing device 20 according to a first embodiment of the present invention, and FIG. 5(*b*) shows the back of the image capturing device 20 of FIG. 5(*a*). As shown in FIG. 5(*a*), the image capturing device 20 includes a front housing 201, a liquid crystal display 202 and keys 203. As shown in FIG. 5(*b*), the image capturing device 20 further includes a sapphire lens 204 and a back housing 205. Preferably, the image capturing device 20 is a hand-held device having a photographing function. The sapphire lens 204 can also be applied to the mobile device, e.g. the hand-held game console, MP3 player, notebook computer, tablet PC, global positioning system, event data recorder, etc.

Please refer to FIG. 5(*c*), which is a cross-sectional view of an image capturing device structure 22 according to a first embodiment of the present invention. The image capturing device structure 22 includes the sapphire lens 204, the glue 210, a lens device 208 and the liquid crystal display 202. The lens device 208 includes a lens module 206, a circuit board 207 and the back housing 205. The lens module 206 is coupled to the circuit board 207. For example, the back housing 205 is a back housing of a cellphone. The back housing 205 is disposed on the liquid crystal display 202 and surrounds the lens module 206. The back housing 205 has an opening area 209 corresponding to the position of the lens module 206 so that the lens module 206 can take images therethrough. The sapphire lens 204 is directly connected to the lens device 208 via the glue 210 at a first temperature.

The sapphire lens 204 has a crystal axis, a crystal structure and a transmittance. The crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101). The crystal structure is a single-crystal structure, and the transmittance is larger than or equal to 80%. Since the sapphire lens 204 has a hard material and a large mechanical strength, and is scratch-resisting and anticorrosive, it is suitable for serving as a protecting lens for the image capturing device 20. However, not all kinds of sapphires are suitable for serving as the protecting lens. Only the sapphire having a single-crystal structure is suitable for serving as the protecting lens since the transmittance thereof is larger than 80%; the sapphire having a poly-crystal structure is not suitable for serving as the protecting lens since the transmittance thereof is smaller than 60%, which does not meet the requirement.

Moreover, the physical or optical characteristics of the sapphire lens 204 vary with the crystal axis thereof. For example, the physical characteristics of the sapphire lens 204 include at least one of the hardness, the Young's modulus, the compressive strength and the thermal conductivity. For example, the optical characteristics of the sapphire lens 204 include the transmittance. Table 1 shows the comparison of each crystal axis of the sapphire lens 204 with the tempered glass on the physical and optical characteristics.

TABLE 1

| Characteristic | Unit | C-axis of the sapphire | A-axis of the sapphire | R-axis of the sapphire | M-axis of the sapphire | Tempered glass |
| --- | --- | --- | --- | --- | --- | --- |
| Hardness | Kgf/cm2 | 2150 ± 50 | 1850 ± 50 | 2200 ± 50 | 1850 ± 50 | 674 |
| Young's modulus | GPa | 460 ± 50 | 460 ± 50 | 460 ± 50 | 460 ± 50 | 71.7 |
| Compressive strength | MPa | ≥2000 | ≥2000 | ≥2000 | ≥2000 | ≥800 |
| Thermal conductivity | W/m-k | 32 ± 5 | 32 ± 5 | 32 ± 5 | 32 ± 5 | 1.2 |
| Transmittance | % | >85 | >85 | >85 | >85 | >90 |

When the crystal axis of the sapphire lens 204 is anyone of the c-axis, a-axis, m-axis and r-axis, the hardness, the Young's modulus, the compressive strength and the thermal conductivity of the sapphire lens 204 are all far better than those of the tempered glass. Although the transmittance of the sapphire lens 204 is a bit lower than that of the tempered glass, it is still not bad.

In one embodiment, for enhancing the transmittance of the sapphire lens 204, before the sapphire lens 204 is connected to the back housing 205, an anti-reflection layer (not shown) can be plated on the sapphire lens 204 first. The number of layers and the thickness of the anti-reflection layer are related to the transmittance. The anti-reflection layer includes at least one layer. Preferably, the anti-reflection layer includes tens of layers. The thickness of each layer is about 3-5 microns.

The anti-reflection layer can be formed on the surface 211 or the surface 212 of the sapphire lens 204. Before the anti-reflection layer is formed on the sapphire lens 204, the transmittance is at least above 80%. After the anti-reflection layer is formed on the sapphire lens 204, the transmittance is at least above 95%. The anti-reflection layer can be formed via the physical vapor deposition or chemical vapor deposition. Besides, the anti-reflection layer includes the metal oxide or semiconductor oxide.

In another embodiment, since the sapphire lens 204 is more heat-resistant and anticorrosive than general materials, before it is connected to the back housing 205, a printing ink layer (not shown) or a decorative film layer (not shown) can be formed on the sapphire lens 204 via a specific process at a second temperature. The specific process includes the printing ink transfer, physical vapor deposition, laser carving, silk printing or spraying.

In another embodiment, the anti-reflection layer and the printing ink layer can be formed on the surface 211 or the surface 212 of the sapphire lens 204 according to different order, or formed on the surface 211 of the sapphire lens 204 and the surface 212 thereof respectively.

Figure 5C:
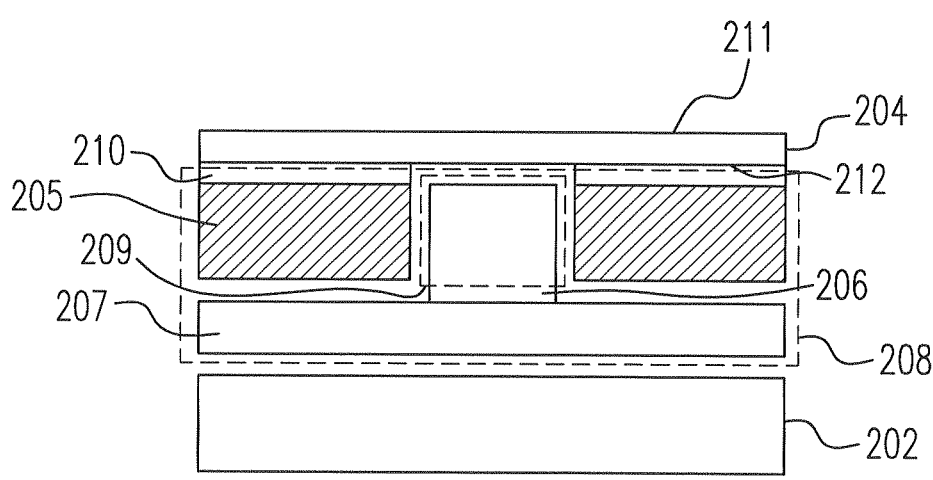

Please refer to FIG. 5(c) again. In the first embodiment of the present invention, the sapphire lens 204 is directly connected to the back housing 205 via the glue 210 for protecting the lens module 206. The back housing 205 is a housing for a cellphone. The glue 210 is a macromolecular glue having a connecting reaction at the first temperature. The macromolecular glue includes the high-temperature reaction glue, photosensitive glue (e.g. the UV glue) or dual-composition glue.

In another embodiment, the anti-reflection layer or the printing ink layer has been formed on the sapphire lens 204. The anti-reflection layer or the printing ink layer is directly connected to the back housing 205 via the glue 210.

In another embodiment, through the heat-resistant characteristic of the sapphire lens 204, the sapphire lens 204 is heter-connected to the back housing 205 at a third temperature without using the glue 210.

Figure 6A:
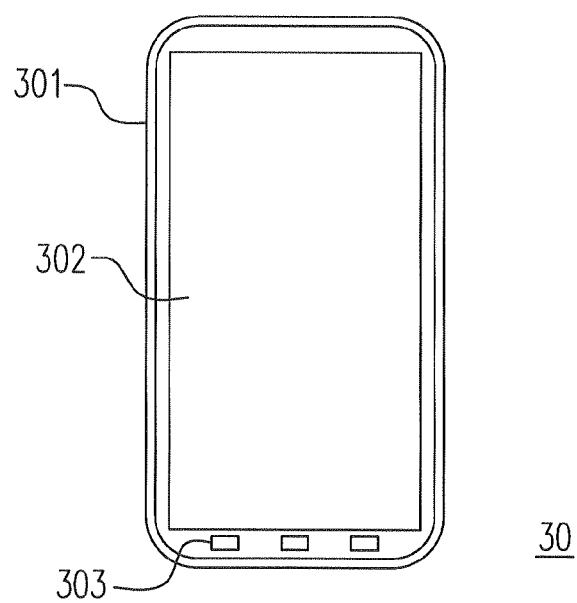
FIG. 6(*a*) shows the front of an image capturing device according to a second embodiment of the present invention.
Figure 6B:
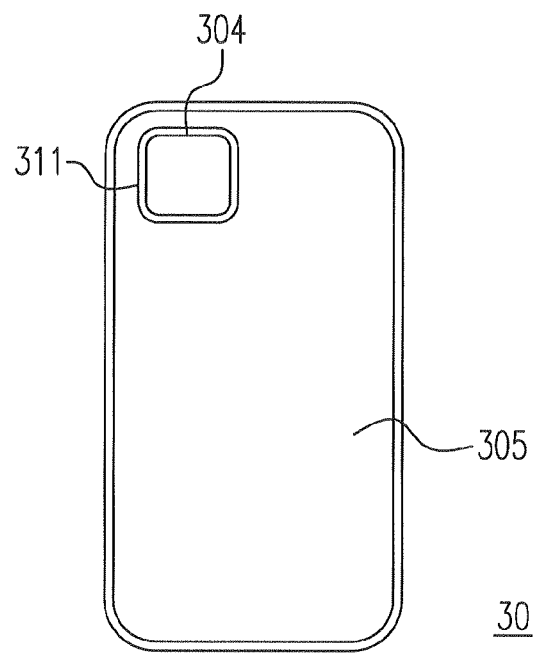

Please refer to FIGS. 6(a) and 6(b). FIG. 6(a) shows the front of an image capturing device 30 according to a first embodiment of the present invention, and FIG. 6(b) shows the back of the image capturing device 30 of FIG. 6(a). As shown in FIG. 6(a), the image capturing device 30 includes a front housing 301, a liquid crystal display 302 and keys 303. As shown in FIG. 6(b), the image capturing device 30 further includes a sapphire lens 304, a first back housing 311 and a second back housing 305. In one embodiment, the first back housing 311 is a battery housing, and the second back housing 305 is a back housing of a cellphone.

Figure 6C:
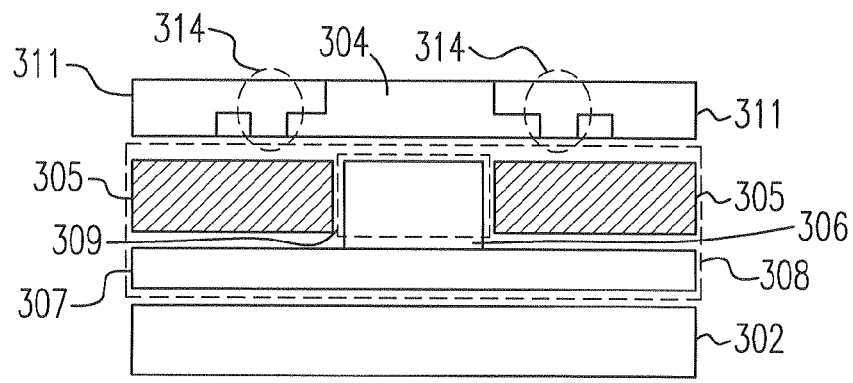

Please refer to FIG. 6(c), which is a cross-sectional view of an image capturing device structure 32 according to a second embodiment of the present invention. The image capturing device structure 32 includes the sapphire lens 304, a lens device 308 and the liquid crystal display 302. The lens device 308 includes a lens module 306, a circuit board 307 and the second back housing 305. The lens module 306 is coupled to the circuit board 307. The second back housing 305 is disposed on the liquid crystal display 302 and surrounds the lens module 306. The second back housing 305 has an opening area 309 corresponding to the position of the lens module 306.

Figure 6D:
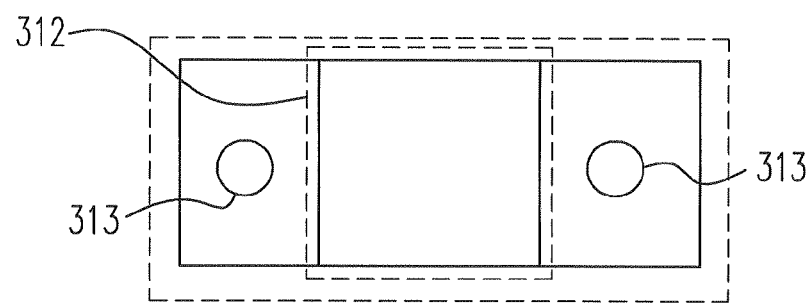

Please refer to FIG. 6(d), which is a top view of the sapphire lens 304. As shown in FIG. 6(d), the sapphire lens 304 has a plurality of openings 313, and the first back housing 311 also has an opening area 312. The opening areas 312, 309 are both corresponding to the position of the lens module 306 so that the lens module 306 can take images therethrough.

Figure 6E:
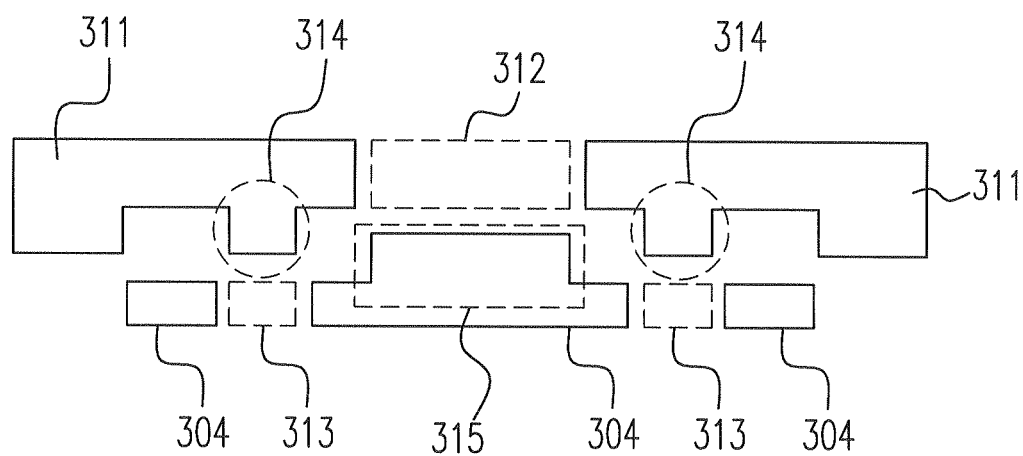

Please refer to FIG. 6(e), which shows how the first back housing 311 is connected to the sapphire lens 304. The sapphire lens 304 has a protruding portion 315 aligned with the lens module 306, as shown in FIGS. 6(c) and 6(e). The first back housing 311 has a plurality of hot-melt pillars 314. The first back housing 311 is connected to the sapphire lens 304 by causing the hot-melt pillars 314 to pass through the openings 313 and heating the hot-melt pillars 314. The hot-melt pillars 314 will be melted into the glues (not shown) due to the heating. The hot-melt pillars 314 are made of thermoplastic materials. In another embodiment, through the heat-resistant characteristic of the sapphire lens 304, the sapphire lens 304 can be heter-connected to the first back housing 311 at a fourth temperature without heating the hot-melt pillars 314 to form the glues.

Identical to the first embodiment of the present invention, before the sapphire lens 304 is connected to the first back housing 311, a film can be plated on the sapphire lens 304 first. For example, the film can be the anti-reflection layer, the printing ink layer or the decorative film layer to enhance the transmittance and aesthetic feeling.

Figure 7A:
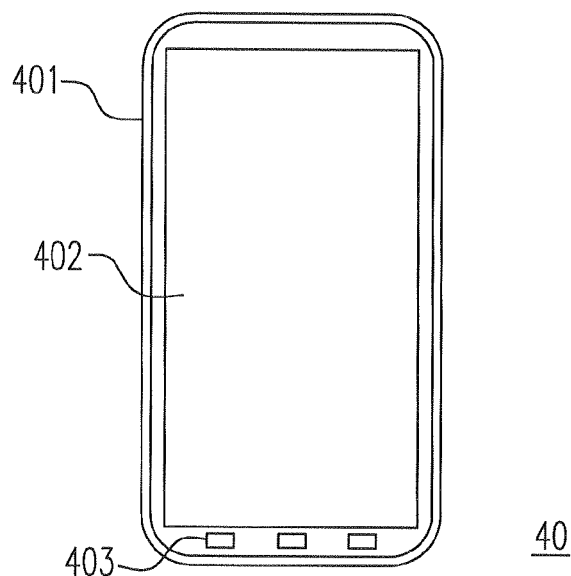
FIG. 7(*a*) shows the front of an image capturing device according to a third embodiment of the present invention.
Figure 7B:
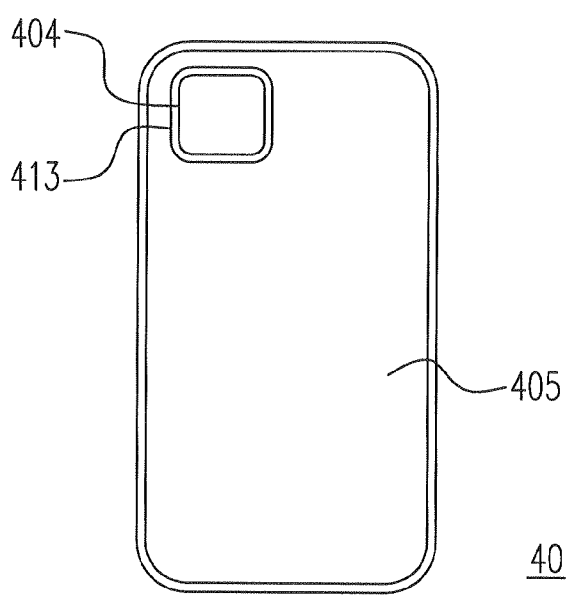

Please refer to FIGS. 7(a) and 7(b). FIG. 7(a) shows the front of an image capturing device 40 according to a third embodiment of the present invention, and FIG. 7(b) shows the back of the image capturing device 40 of FIG. 7(a). As shown in FIG. 7(a), the image capturing device 40 includes a front housing 401, a liquid crystal display 402 and keys 403. As shown in FIG. 7(b), the image capturing device 40 further includes a sapphire lens 404 and a back housing 405. The back housing 405 has a hollow area 413 for embedding the sapphire lens 404 therein.

Figure 7C:
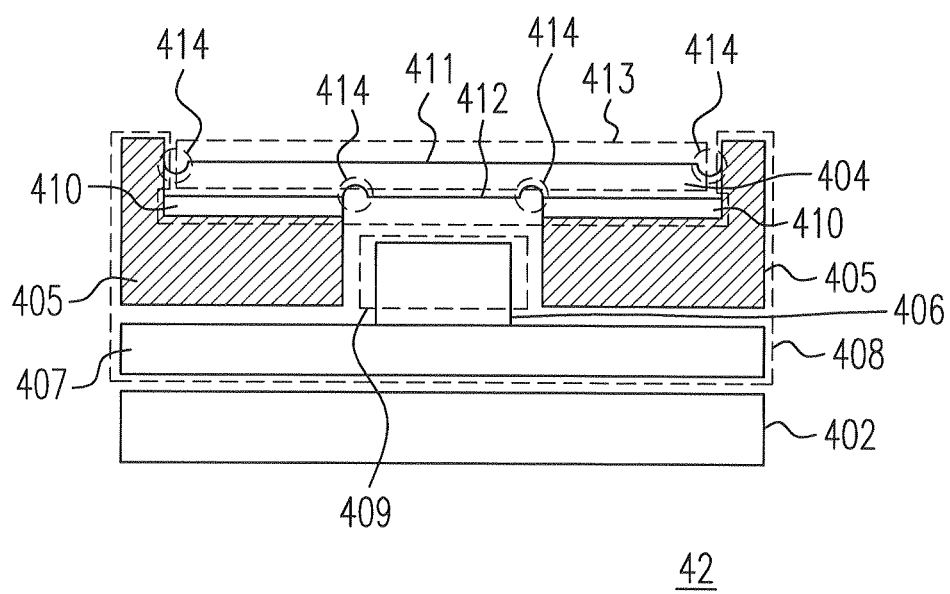

Please refer to FIG. 7(c), which is a cross-sectional view of an image capturing device structure 42 according to a third embodiment of the present invention. The image capturing device structure 42 includes the sapphire lens 404, the glue 410, a lens device 408 and the liquid crystal display 402. The lens device 408 includes a lens module 406, a circuit board 407 and the back housing 405. The back housing 405 has an opening area 409 corresponding to the position of the lens module 406 so that the lens module 406 can take images therethrough. The sapphire lens 404 has a plurality of recesses 414.

Similarly, before the sapphire lens 404 is connected to the back housing 405, a film can be plated on the sapphire lens 404 first. For example, the film can be the anti-reflection layer, the printing ink layer or the decorative film layer to enhance the transmittance and aesthetic feeling.

The sapphire lens 404 is embedded in the hollow area 413 by an injection molding technology. Firstly, the recesses 414 are formed on the sapphire lens 404 in the way of polishing or etching. Then, the sapphire lens 404 is placed in a mold (not shown), wherein the mold has a shape identical to that of the back housing 405, and the sapphire lens 404 is placed in a position corresponding to the position of the hollow area 413. Next, a plastic fluid (not shown) is poured into the mold at a fifth temperature, and the back housing 405 is formed by the injection molding technology to cause the sapphire lens 404 to be embedded in the hollow area 413 of the back housing 405.

In one embodiment, the back housing 405 is made of plastics. When the sapphire lens 404 is connected to the back housing 405 via the glue 410, the recesses 414 have the function of dredging the plastic fluid and the glue 410. At the fifth temperature, the plastic fluid and the glue 410 will be overflowed onto one or both of the surface 411 and the surface 412 of the sapphire lens 404. The recesses 414 can prevent the plastic fluid and the glue 410 from overflowing. In another embodiment, the glue 410 can be omitted, and the recesses 414 can prevent the plastic fluid from overflowing.

After the injection molding, the sapphire lens 404 is naturally embedded in the hollow area 413 of the back housing 405.

Figure 8:
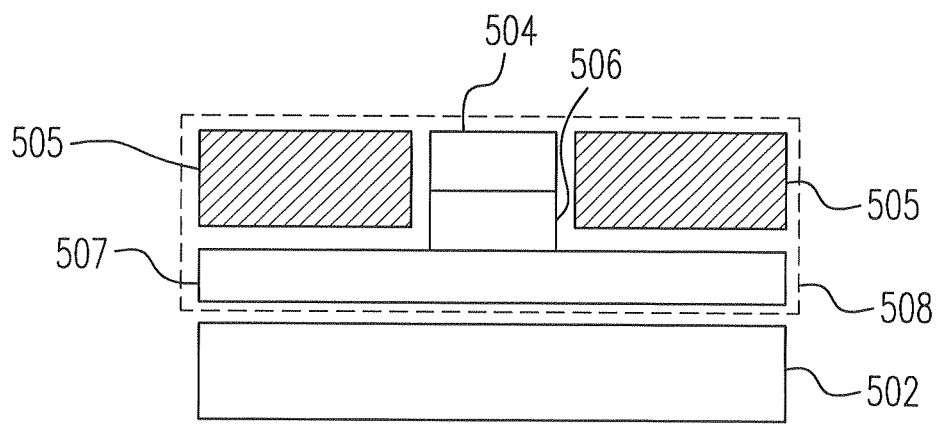
FIG. 8 is a cross-sectional view of an image capturing device structure according to a fourth embodiment of the present invention.

Please refer to FIG. 8, which is a cross-sectional view of an image capturing device structure 52 according to a fourth embodiment of the present invention. The image capturing device structure 52 includes a lens device 508 and a liquid crystal display 502. The lens device 508 includes a lens module 506, a sapphire lens 504 and a housing 505. The sapphire lens 504 is disposed on the lens module 506, directly serves as the image-capturing optical lens for the lens module 506, and simultaneously has the high-hardness, scratch-resistant, anti-wear and impact-resistant characteristics.

EMBODIMENTS

1. An image capturing device, comprising:
   a lens device including a first housing; and
   a sapphire lens directly connected to the first housing for protecting the lens device, wherein the sapphire lens includes a crystal structure and has a crystal axis, the crystal structure is a single-crystal structure, and the crystal axis includes one selected from a group consisting of c-axis (0001), a-axis ($1\bar{2}10$), a-axis ($11\bar{2}0$), a-axis ($2\bar{1}\bar{1}0$), a-axis ($\bar{1}\bar{1}20$), a-axis ($\bar{2}110$), a-axis ($\bar{1}2\bar{1}0$), m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), r-axis ($10\bar{1}1$), r-axis ($\bar{1}01\bar{1}$), r-axis ($01\bar{1}\bar{1}$), r-axis (0111), r-axis ($1\bar{1}0\bar{1}$) and r-axis ($\bar{1}101$).

2. The image capturing device of Embodiment 1, wherein:
   the lens device further includes a lens module and a circuit board coupled to the lens module, and the first housing surrounds the lens module;
   the sapphire lens is connected to the first housing via a glue at a first temperature, wherein the glue is a macromolecular glue having an adhesion reaction at the first temperature and including one selected from a group consisting of a high-temperature reaction glue, a photosensitive glue and a dual-composition glue; and
   the sapphire lens is heter-connected to the first housing at a second temperature.

3. The image capturing device of any one of Embodiments 1-2, wherein:
   the first housing is a cellphone housing; and
   the image capturing device further includes a liquid crystal display, and the lens device is disposed on the liquid crystal display.

4. The image capturing device of any one of Embodiments 1-3, wherein:
   the lens device further includes a second housing, a lens module and a circuit board;
   the sapphire lens is connected to the first housing via a glue, wherein the glue is a macromolecular glue including one selected from a group consisting of a high-temperature reaction glue, a photosensitive glue and a dual-composition glue;
   the first housing has a plurality of hot-melt pillars, and the sapphire lens has a plurality of openings;
   the first housing is connected to the sapphire lens by causing the hot-melt pillars to pass through the openings and heating the hot-melt pillars, wherein the hot-melt pillars include a thermoplastic material;
   the sapphire lens has a protruding portion aligned with the lens module; and
   the second housing surrounds the lens module, and the circuit board is coupled to the lens module.

5. The image capturing device of any one of Embodiments 1-4, wherein:
the first housing is a battery housing, and the second housing is a cellphone housing; and
the image capturing device further includes a liquid crystal display, and the lens device is disposed on the liquid crystal display.

6. An image capturing device, comprising:
a lens device having a hollow area; and
a sapphire lens disposed in the hollow area for protecting the lens device, wherein the sapphire lens includes a crystal structure and has a crystal axis, the crystal structure is a single-crystal structure, and the crystal axis includes one selected from a group consisting of c-axis (0001), a-axis ($1\bar{2}10$), a-axis ($11\bar{2}0$), a-axis ($2\bar{1}\bar{1}0$), a-axis ($\bar{1}\bar{1}20$), a-axis ($\bar{2}110$), a-axis ($\bar{1}2\bar{1}0$), m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), r-axis ($10\bar{1}1$), r-axis ($\bar{1}01\bar{1}$), r-axis ($01\bar{1}\bar{1}$), r-axis ($0\bar{1}11$), r-axis ($1\bar{1}0\bar{1}$) and r-axis ($\bar{1}101$).

7. The image capturing device of Embodiment 6, wherein:
the lens device further includes a housing, a lens module and a circuit board coupled to the lens module, and the housing surrounds the lens module;
the housing has the hollow area, and when the sapphire lens is placed in a mold, the sapphire lens is embedded in the hollow area by an injection molding technology;
the sapphire lens is connected to the lens device via a glue so that the lens device is protected by the sapphire lens, wherein the glue is a macromolecular glue including one selected from a group consisting of a high-temperature reaction glue, a photosensitive glue and a dual-composition glue; and
the sapphire lens has a plurality of recesses, the housing includes a plastic, and when the sapphire lens is connected to the housing via the glue, the recesses prevent the plastic from overflowing.

8. The image capturing device of any one of Embodiments 6-7, wherein:
the first housing is a cellphone housing; and
the image capturing device further includes a liquid crystal display, and the lens device is disposed on the liquid crystal display.

9. An image capturing device, comprising:
a lens device; and
a sapphire lens directly connected to the lens device, wherein the sapphire lens includes a crystal structure and has a crystal axis, the crystal structure is a single-crystal structure, and the crystal axis includes one selected from a group consisting of c-axis (0001), a-axis ($1\bar{2}10$), a-axis ($11\bar{2}0$), a-axis ($2\bar{1}\bar{1}0$), a-axis ($\bar{1}\bar{1}20$), a-axis ($\bar{2}110$), a-axis ($\bar{1}2\bar{1}0$), m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), r-axis ($10\bar{1}1$), r-axis ($\bar{1}01\bar{1}$), r-axis ($01\bar{1}\bar{1}$), r-axix ($0\bar{1}11$), r-axis ($1\bar{1}0\bar{1}$) and r-axis ($\bar{1}101$).

10. The image capturing device of Embodiment 9, wherein:
the lens device includes a lens module, a housing surrounding the lens module, and a circuit board coupled to the lens module;
the sapphire lens is connected to the lens device via a glue so that the lens device is protected by the sapphire lens, wherein the glue is a macromolecular glue including one selected from a group consisting of a high-temperature reaction glue, a photosensitive glue and a dual-composition glue;
the sapphire lens is connected to the housing via the macromolecular glue at a first temperature; and
the sapphire lens is heter-connected to the housing at a second temperature.

11. The image capturing device of any one of Embodiments 9-10, wherein:
the housing is a cellphone housing; and
the image capturing device further includes a liquid crystal display, and the lens device is disposed on the liquid crystal display.

12. The image capturing device of any one of Embodiments 9-11, wherein:
the lens device includes a first housing, a second housing, a lens module and a circuit board;
the sapphire lens is connected to the lens device via a glue so that the lens device is protected by the sapphire lens, wherein the glue is a macromolecular glue including one selected from a group consisting of a high-temperature reaction glue, a photosensitive glue and a dual-composition glue;
the first housing includes a plurality of hot-melt pillars, and the sapphire lens includes a plurality of openings;
the first housing is connected to the sapphire lens by causing the hot-melt pillars to pass through the openings and heating the hot-melt pillars, wherein the hot-melt pillars include a thermoplastic material; and
the sapphire lens has a protruding portion aligned with the lens module;
the second housing surrounds the lens module, and the circuit board is coupled to the lens module.

13. The image capturing device of any one of Embodiments 9-12, wherein:
the first housing is a battery housing, and the second housing is a cellphone housing; and
the image capturing device further includes a liquid crystal display, and the lens device is disposed on the liquid crystal display.

14. An image capturing device, comprising:
a lens device; and
a sapphire lens directly connected to the lens device.

15. The image capturing device of Embodiment 14, wherein:
the sapphire lens includes a crystal structure and has a crystal axis, the crystal structure is a single-crystal structure, and the crystal axis includes one selected from a group consisting of c-axis (0001), a-axis ($1\bar{2}10$), a-axis ($11\bar{2}0$), a-axis ($2\bar{1}\bar{1}0$), a-axis ($\bar{1}\bar{1}20$), a-axis ($\bar{2}110$), a-axis ($\bar{1}2\bar{1}0$), m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), r-axis ($10\bar{1}1$), r-axis ($\bar{1}01\bar{1}$), r-axis ($01\bar{1}\bar{1}$), r-axis ($0\bar{1}11$), r-axis ($1\bar{1}0\bar{1}$) and r-axis ($\bar{1}101$);
the lens device includes a lens module, a housing surrounding the lens module, and a circuit board coupled to the lens module;
the sapphire lens is connected to the lens device via a glue so that the lens device is protected by the sapphire lens, wherein the glue is a macromolecular glue including one selected from a group consisting of a high-temperature reaction glue, a photosensitive glue and a dual-composition glue;
the sapphire lens is connected to the housing via the macromolecular glue at a first temperature, wherein the macromolecular glue has an adhesion reaction at the first temperature; and
the sapphire lens is heter-connected to the housing at a second temperature.

16. The image capturing device of any one of Embodiments 14-15, wherein:
the housing is a cellphone housing; and
the image capturing device further includes a liquid crystal display, and the lens device is disposed on the liquid crystal display.

17. The image capturing device of any one of Embodiments 14-16, wherein:
the sapphire lens includes a crystal structure and has a crystal axis, the crystal structure is a single-crystal structure, and the crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101);
the lens device includes a first housing, a second housing, a lens module and a circuit board;
the sapphire lens is connected to the lens device via a glue so that the lens device is protected by the sapphire lens, wherein the glue is a macromolecular glue including one selected from a group consisting of a high-temperature reaction glue, a photosensitive glue and a dual-composition glue;
the first housing includes a plurality of hot-melt pillars, and the sapphire lens includes a plurality of openings;
the first housing is connected to the sapphire lens by causing the hot-melt pillars to pass through the openings and heating the hot-melt pillars, wherein the hot-melt pillars include a thermoplastic material;
the sapphire lens has a protruding portion aligned with the lens module; and
the second housing surrounds the lens module, and the circuit board is coupled to the lens module.

18. The image capturing device of any one of Embodiments 14-17, wherein:
the first housing is a battery housing, and the second housing is a cellphone housing; and
the image capturing device further includes a liquid crystal display, and the lens device is disposed on the liquid crystal display.

19. The image capturing device of any one of Embodiments 14-18, wherein:
the lens device includes a lens module, a housing surrounding the lens module, and a circuit board coupled to the lens module;
the sapphire lens is embedded in the lens device;
the housing has a hollow area, and when the sapphire lens is placed in a mold, the sapphire lens is embedded in the hollow area by an injection molding technology;
the sapphire lens is connected to the lens device via a glue so that the lens device is protected by the sapphire lens, wherein the glue is a macromolecular glue including one selected from a group consisting of a high-temperature reaction glue, a photosensitive glue and a dual-composition glue;
the sapphire lens includes a plurality of recesses, the housing includes a plastic, and when the sapphire lens is connected to the housing via the glue, the recesses prevent the plastic from overflowing;
the housing is a cellphone housing; and
the image capturing device further includes a liquid crystal display, and the lens device is disposed on the liquid crystal display.

20. A lens device, comprising:
a lens module; and
a sapphire lens disposed on the lens module to constitute the lens device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image capturing device used for a cellphone having a liquid crystal display, comprising:
a lens device disposed within the cellphone and including a lens module, and a first housing surrounding the lens module and constituting a back housing of the cellphone which is far away from the liquid crystal display, wherein top surfaces of the back housing and the lens module are on the same level; and
a sapphire lens connected to the first housing and configured to be at least one part of an outermost layer of the cellphone in a manner of protecting the lens module, wherein the sapphire lens includes a crystal structure and has a crystal axis, the crystal structure is a single-crystal structure, and the crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis($\bar{1}$101), wherein
the sapphire lens is directly adhered onto the first housing of the lens device via a glue so that the lens device is protected by the sapphire lens, and the glue is a macromolecular glue including one selected from a group consisting of a high-temperature reaction glue, a photosensitive glue and a dual-composition glue.

2. An image capturing device as claimed in claim 1, wherein:
the lens device further includes a lens module and a circuit board coupled to the lens module, and the first housing surrounds the lens module;
the sapphire lens is connected to the first housing via a glue at a first temperature, wherein the glue is a macromolecular glue having an adhesion reaction at the first temperature and including one selected from a group consisting of a high-temperature reaction glue, a photosensitive glue and a dual-composition glue; and
the sapphire lens is heter-connected to the first housing at a second temperature.

3. An image capturing device as claimed in claim 2, wherein:
the first housing is a cellphone housing; and
the image capturing device further includes a liquid crystal display, and the lens device is disposed on the liquid crystal display.

4. An image capturing device as claimed in claim 1, wherein:
the lens device further includes a circuit board coupled to the lens module; and
the sapphire lens is connected to the first housing via the glue at a temperature.

5. An image capturing device disposed within a cellphone having a liquid crystal display, comprising:
a lens device disposed within the cellphone and including a lens module surrounded by a back housing of the cellphone which is far away from the liquid crystal display, wherein top surfaces of the back housing and the lens module are on the same level; and
a sapphire lens connected to the lens device and configured to be an outermost layer of the cellphone, wherein the sapphire lens includes a crystal structure and has a crystal axis, the crystal structure is a single-crystal structure, and the crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101)($\bar{1}$101), wherein the sapphire lens is directly adhered onto the first housing of the lens device via a glue so that the lens device is protected by the sapphire lens, and the glue is a macromolecular glue including one selected from a group consisting of a high-temperature reaction glue, a photosensitive glue and a dual-composition glue.

6. An image capturing device as claimed in claim 5, wherein:
the lens device includes a circuit board coupled to the lens module; and
the sapphire lens is connected to the back housing via the macromolecular glue at a first temperature.

7. An image capturing device used for a cellphone, comprising:
a lens device disposed within the cellphone and including a lens module, and a first housing surrounding the lens module and constituting a back housing of the cellphone, wherein top surfaces of the back housing and the lens module are on the same level; and
a sapphire lens connected to the lens device and configured to be an outermost layer of the cellphone, wherein the sapphire lens is directly adhered onto the first housing of the lens device via a glue so that the lens device is protected by the sapphire lens, and the glue is a macromolecular glue including one selected from a group consisting of a high-temperature reaction glue, a photosensitive glue, and a dual-composition glue.

8. An image capturing device as claimed in claim 7, wherein:
the sapphire lens includes a crystal structure and has a crystal axis, the crystal structure is a single-crystal structure, and the crystal axis includes one selected from a group consisting of c-axis (0001), a-axis (1$\bar{2}$10), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101);
the lens device includes a circuit board coupled to the lens module; and
the sapphire lens is connected to the housing via the macromolecular glue at a first temperature, wherein the macromolecular glue has an adhesion reaction at the first temperature.

9. A lens device disposed within a cellphone having a liquid crystal display, comprising:
a lens module;
a first housing surrounding the lens module and constituting a back housing of the cellphone which is far away from the liquid crystal display, wherein top surfaces of the back housing and the lens module are on the same level, and
a sapphire lens disposed on the lens module to constitute the lens device and configured to be an outermost layer of the cellphone, wherein the sapphire lens includes a crystal structure and has a crystal axis, the crystal structure is a single-crystal structure, and the crystal axis includes one selected from a group consisting of c-axis (0001), a-axis ( ), a-axis (11$\bar{2}$0), a-axis (2$\bar{1}\bar{1}$0), a-axis ($\bar{1}\bar{1}$20), a-axis ($\bar{2}$110), a-axis ($\bar{1}$2$\bar{1}$0), m-axis ($\bar{1}$010), m-axis ($\bar{1}$100), m-axis (01$\bar{1}$0), m-axis (10$\bar{1}$0), m-axis (1$\bar{1}$00), m-axis (0$\bar{1}$10), r-axis (10$\bar{1}$1), r-axis ($\bar{1}$01$\bar{1}$), r-axis (01$\bar{1}\bar{1}$), r-axis (0$\bar{1}$11), r-axis (1$\bar{1}$0$\bar{1}$) and r-axis ($\bar{1}$101), wherein the sapphire lens is directly adhered onto the first housing of the lens module via a glue so that the lens module is protected by the sapphire lens, and the glue is a macromolecular glue including one selected from a group consisting of a high-temperature reaction glue, a photosensitive glue, and a dual-composition glue.

* * * * *